(12) United States Patent
Hasenfratz et al.

(10) Patent No.: US 10,184,434 B2
(45) Date of Patent: Jan. 22, 2019

(54) FILTER DEVICE, IN PARTICULAR FOR GAS FILTRATION

(71) Applicant: MANN+HUMMEL GMBH, Ludwigsburg (DE)

(72) Inventors: Robert Hasenfratz, Waiblingen (DE); Fabian Wagner, Moeglingen (DE); André Roesgen, Remshalden (DE); Christian Thalmann, Speyer (DE); Frank Pflueger, Sachsenheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 201 days.

(21) Appl. No.: 15/130,043

(22) Filed: Apr. 15, 2016

(65) Prior Publication Data

US 2016/0228804 A1 Aug. 11, 2016

Related U.S. Application Data

(63) Continuation of application No. PCT/EP2014/071875, filed on Oct. 13, 2014.

(30) Foreign Application Priority Data

Oct. 15, 2013 (DE) .................. 10 2013 017 034

(51) Int. Cl.
*F02M 35/024* (2006.01)
*B01D 46/12* (2006.01)
*B01D 46/00* (2006.01)
*B01D 46/52* (2006.01)
*F02M 35/02* (2006.01)

(52) U.S. Cl.
CPC ...... *F02M 35/02416* (2013.01); *B01D 46/002* (2013.01); *B01D 46/0005* (2013.01); *B01D 46/12* (2013.01); *B01D 46/521* (2013.01); *F02M 35/0215* (2013.01); *B01D 2265/02* (2013.01); *B01D 2265/025* (2013.01)

(58) Field of Classification Search
CPC .. B01D 46/0005; B01D 46/002; B01D 46/12; B01D 2265/02; B01D 2265/025; B01D 46/521; F02M 35/0215; F02M 35/02416
See application file for complete search history.

(56) References Cited

U.S. PATENT DOCUMENTS

| | | | |
|---|---|---|---|
| 4,640,698 A | 2/1987 | Ohishi et al. | |
| 6,312,489 B1 | 11/2001 | Ernst et al. | |
| 8,858,668 B2 | 10/2014 | Felber et al. | |
| 2009/0188217 A1 | 7/2009 | Amann | |
| 2012/0055127 A1* | 3/2012 | Holzmann | B01D 46/0001 55/484 |

(Continued)

FOREIGN PATENT DOCUMENTS

| | | |
|---|---|---|
| CN | 101111297 A | 1/2008 |
| DE | 202008013309 U1 | 3/2009 |
| DE | 102011083657 A1 | 3/2013 |

(Continued)

*Primary Examiner* — Robert Clemente
(74) *Attorney, Agent, or Firm* — James Hasselbeck

(57) ABSTRACT

A filter device having a filter housing and a filter element having a first and a second filter media body at a common filter element housing. Cooperating positive-locking elements are disposed at the filter housing and a the filter element housing, which engage in a positive-locking manner.

24 Claims, 3 Drawing Sheets

(56) References Cited

U.S. PATENT DOCUMENTS

2012/0159910 A1    6/2012   Mills et al.
2014/0000228 A1    1/2014   Enderich et al.

FOREIGN PATENT DOCUMENTS

| DE | 202012012669 U1 | 8/2013 |
|---|---|---|
| EP | 2135662 A1 | 12/2009 |
| WO | 2013045285 A1 | 4/2013 |
| WO | 2014161933 A1 | 10/2014 |
| WO | 2014177598 A1 | 11/2014 |

\* cited by examiner

FILTER DEVICE, IN PARTICULAR FOR GAS FILTRATION

TECHNICAL FIELD

The present invention relates to a filter device, in particular for gas filtration.

BACKGROUND

A filter element is known from DE 10 2011 083 657 A1, which can be used in a fresh air system of a vehicle and which comprises two separately formed filter medium bodies implemented as pleated filters. The filter media bodies are held at a carrier body comprising two end plates which are connected to each other via two parallel strips. An outflow aperture for the cleaned fluid is introduced into one of the end plates. The two filter media bodies are inserted opposite each other between the end plates and the connecting strips and enclose an intermediate clean chamber from which the cleaned fluid can be discharged via the outflow aperture in the end plate. The two filter media bodies are cuboidally formed and arranged to each other as mirror images in the filter element.

SUMMARY

The object of the present invention is to create a compactly designed filter device having a high filtration performance.

The filter device according to the present invention is preferably used for filtering gas, for example, for filtering the combustion air for an internal combustion engine or for cleaning the fresh air which is supplied to cabins, for example, vehicle interiors. An application for filtering liquids is, however, also possible.

The filter device comprises a filter housing and a filter element insertable into the filter housing. The filter element comprises a carrier body implemented as a filter element housing and at least one first filter media body at which the filtration is carried out. The first filter media body delimits a clean chamber by a filter element housing, in which the cleaned fluid is collected downstream of the two filter media bodies, which subsequently is discharged via an outflow aperture in the filter element housing. Advantageously, a receiving pocket is introduced into the filter element housing, into which the filter media body is inserted.

In the case of a particularly preferable embodiment, the filter element is provided with a first filter media body and a second filter media body at a common filter element housing, which delimit a common clean chamber.

Positive-locking elements are disposed respectively at the receiving filter housing and at the filter element housing of the filter element, which act together in a sealing position and positive-lockingly interlock. The positive-locking elements ensure a permanently secure fixing of the filter element in the receiving filter housing and, thus, also ensure a reliable functioning of the filter device also over long operating periods. A constant relative position of the filter element is ensured in the filter housing so that the flow conditions, in particular for inflowing and outflowing the filter media bodies do not change for the operating period. In doing so, the efficiency of the filter device is improved for the total operating period. The cooperating positive-locking elements hold the filter element in the opposite direction of an installation direction at the filter housing.

In a preferred embodiment, at least two, optionally three or a plurality of positive-locking elements are disposed at the filter element housing, to which positive-locking elements in a receiving housing of a filter housing and at a housing cover of the filter housing are assigned. The filter element is inserted into the receiving housing which is to be closed by the housing cover. By inserting the filter element into the receiving housing, the positive-locking elements engage at the filter element and at the receiving housing; by fitting the housing cover, the positive-locking element situated at the housing cover also engages with the assigned positive-locking element at the filter element.

Optionally, by fitting the housing cover, the filter element is displaced in the receiving housing transversely to the fitting direction of the cover in that, for example, a slope is provided at the positive-locking element, which runs at an angle to the direction of fitting as well as to the direction of displacement. By way of the slope of the positive-locking element, the fitting movement of the housing cover is translated into a feed movement of the filter element transverse to the direction of fitting. This embodiment has the advantage that the filter element already inserted into the receiving housing can be laterally displaced within the receiving housing until the final installation position is reached. In doing so, the outflow aperture at the filter element is, for example, displaced so far into the direction of a corresponding aperture in the receiving housing until a tight position is achieved, and, for example, a nozzle at the outflow aperture of the filter element protrudes into the outflow aperture in the receiving housing, and a sealing force is applied to a surrounding sealing element between filter element housing and receiving housing.

Thus, the filter element is preferably insertable into the filter housing in two successive installation directions differing from each other. The installation directions are at an angle, for example, perpendicular to each other. First positive-locking elements hold the filter element in the opposite direction of the first installation direction in the filter housing and second positive-locking elements hold the filter element in the opposite direction of the second installation direction in the filter housing.

It can be expedient to dispose at least two of the positive-locking elements at the filter element at the same side of the filter element housing, in particular, situated one above the other, optionally also one next to the other. According to a preferred embodiment, a total of three positive-locking elements are provided at the filter element housing, which are located at a bottom part, a cover part and a side part of the filter element housing. In this instance, a positive-locking element at the bottom and/or the cover part can extend up to the side part in which the further positive-locking element is situated. Thus, all positive-locking elements are disposed at or adjacent to the side part; however, they are offset in height to one another.

According to a further expedient embodiment, a positive-locking element is formed as a laterally projecting support tab at the filter element housing, which is assigned at the side of the housing to a support dome. The support tab in the installed state abuts at the support dome. During installation, it can be differentiated between different support phases, in which, for example, in a first phase, when inserting the filter element into the receiving housing, a side area of the support tab is first braced at the end face of the support dome and, in a subsequent second phase, when the final position is reached, the end edge of the support tab is braced at the surface shell of the support dome. The position change between support tab and support dome is achieved by an appropriate position change of the filter element in the receiving housing, which, in particular, is accompanied by the fitting of the housing cover and the relative displacement of the filter element in the receiving housing. Based on the end-face-sided bracing of the tab at the dome, the filter element is securely held and locked into its final position.

According to a further expedient embodiment, a positive-locking element is formed at the filter housing as a recess having a defined cross-sectional shape. A protrusion having a corresponding cross-sectional shape at a component of the filter housing is assigned to this recess. Owing to the corresponding cross-sectional shapes of recesses and protrusions, the filter element is securely, positively locked.

Optionally, the protrusion, for example, located at the interior side of the housing cover, is formed smaller than the recess which, for example, can be disposed at the top side of the filter element housing. Owing to the smaller implementation of the protrusion, if one of the positive-locking elements is embodied in a chamfered manner, displacing the filter element transversely to the fitting direction during the fitting movement is possible. Recesses and protrusions have, for example, triangular cross sections.

As stated above, the recess is expediently located at the overhead cover part of the filter element housing. The recess can have an edge-sided boundary section on the outside, which is curved particularly convexly outwards. In this instance, the boundary section forms a handle by which the filter element can be manually held and transported.

According to a further expedient embodiment, the filter element housing of the filter element has receiving pockets for the filter media bodies formed open in the outwards direction so that the filter media bodies can be inserted from the outside to the inside into the receiving pockets at the filter element housing. In this instance, the inner contour of the receiving pockets corresponds to the outer contour of the received filter media body so that, transverse to the direction of insertion, the filter media bodies are held in a positive-locking manner in the receiving pockets. The outsides of the filter media bodies form the inflow or crude side and the inside forms the outflow or clean side, via which the cleaned fluid inflows into the clean chamber in the filter element housing.

According to yet a further advantageous embodiment, buffer elements are disposed at the outside of the filter element housing, which are, in particular, made of an elastically flexible material, for example, a vibration damper material and which, in the assembled state, are braced at the interior wall of the receiving housing. The buffer elements are located either at a cover or bottom part of the filter element housing or at a side part.

According to yet another expedient embodiment, the filter media bodies are formed as pleated filters. Embodiments of the filter medium bodies made out of a compact filter material come, however, also into consideration.

The filter media bodies are each expediently cuboidally formed and have parallel inflow and outflow sides. The filter media bodies are preferably situated in diametrically opposite positions at the filter element, and the flow directions through the filter media bodies can run parallel or at an angle to each other. It is, however, also possible to dispose the filter media bodies at the same side of the filter element.

The filter element housing is expediently implemented as a plastic injection molding component. It is possible to implement the filter element housing as an integral plastic injection molding component but also to compose it as a plurality of separate components which are formed as plastic injection molding components.

According to a further expedient embodiment, one or a plurality of positive-locking elements and/or boundary elements, for example a handle, is/are situated in a rear offset of the filter element housing between the first filter media body and the second filter medium body. This has the advantage that the positive-locking or boundary elements are partially or completely disposed between the filter media bodies at the filter element housing and protrude only partially or do not protrude over the edge area of the filter element housing. For this purpose, it can be advantageous that a positive-locking element formed as a support tab and a boundary element formed as a handle are situated in the same rear offset of the filter element housing.

According to yet another expedient embodiment, one or a plurality of positive-locking elements at the filter element and an outflow aperture of the filter element are situated at different sides, in particular, at opposite sides.

BRIEF DESCRIPTION OF THE DRAWINGS

Further advantages and expedient embodiments may be concluded from the further claims, the description of the figures and the drawings.

In the figures, same components are provided with the same reference characters.

DETAILED DESCRIPTION

Figure 1:
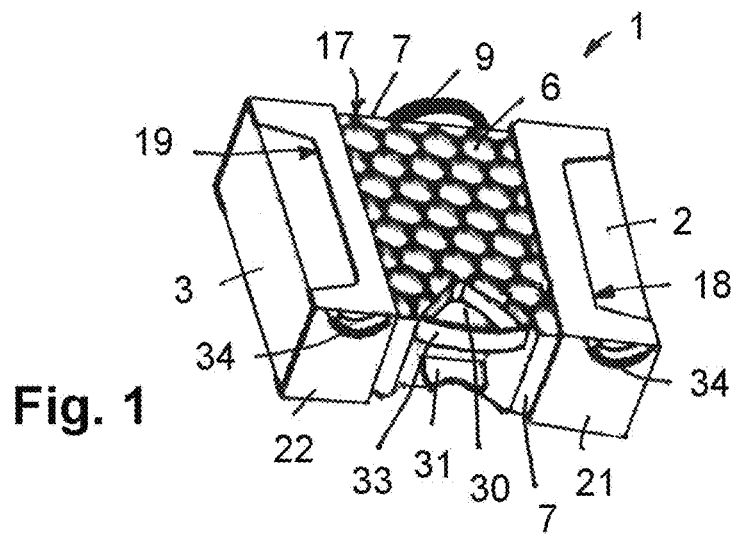
FIG. 1 shows a perspective view of a filter element for gas filtration, having two filter media bodies situated diametrically opposite which are received into receiving pockets at a filter element housing, having positive-locking elements at the filter element housing.
Figure 2:
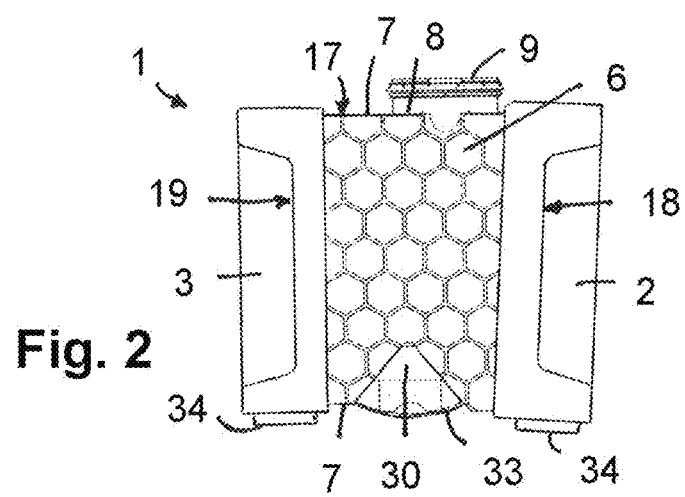
FIG. 2 shows the filter element according to FIG. 1 in a top view.
Figure 3:
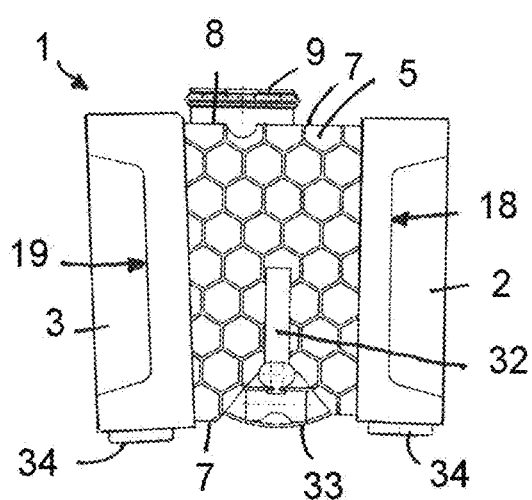
FIG. 3 shows the filter element in a view from below.

FIGS. 1 through 3 show a first exemplary embodiment of a filter element 1 which can be used for gas filtration. Filter element 1 comprises two filter media bodies 2 and 3 at diametrically opposite sides of a filter element housing 17 forming a carrier body for filter media bodies 2, 3. Filter element 1 having at least two filter media bodies 2, 3 forms a filter insert part which is insertable into a filter housing of a filter device.

At filter element housing 17, which has a clean chamber for receiving the cleaned fluid, external receiving pockets 18 and 19 situated on the outside and having surrounding walls 21 or 22 for receiving filter media bodies 2 and 3 are formed. Receiving pockets 18 and 19 are formed outwardly open so that filter media bodies 2, 3 can be inserted from the outside into receiving pockets 18, 19. The outflow sides of filter media bodies 2, 3 adjoin directly at the clean chamber in filter element housing 17.

Filter media bodies 2, 3 situated diametrically opposite are each implemented as pleated filters and cuboidally formed. The filter media bodies can be identically constructed and be of the same size. Embodiments having filter media bodies which are different in size and/or differently formed are, however, also possible.

As can be concluded, in particular, from the views according to FIGS. 2 and 3, the filter media bodies, by their outflow sides adjacent to the interior clean chamber, include a common angle of approximately 10°. Embodiments having parallel situated outflow sides of the filter media bodies are, however, also possible.

Filter element housing 17 has a bottom part 5, a cover part 6 and a side part 7, side part 7 extending between bottom and cover part 5, 6 as well as between the filter media bodies 2, 3. Bottom part 5, cover part 6 and side part 7 enclose, together with filter media bodies 2, 3 connecting on the sides, the interior clean chamber in filter element housing 17.

A plurality of positive-locking elements 30, 31, 32 are introduced into filter element housing 17, which act together with corresponding positive-locking elements at a receiving filter housing. A first positive-locking element 30 is introduced as a triangular recess in the edge area of cover part 6, and forms a recessed support area at which boundary section 33 formed as a handle is outwardly disposed. A second positive-locking element 31 is formed as a support tab which extends at side part 7 and is situated at a distance to bottom part 5 and to cover part 6. Support tab 31 extends outwards alongside part 7.

Third positive-locking element 32 is introduced as a groove-shaped recess into bottom part 5 and extends into the longitudinal direction—approximately parallel to the outflow sides of filter media bodies 2, 3. Third positive-locking element 32 also forms a recessed support area. Triangular recess 30 and also groove-shaped recess 32 are disposed adjacent to side part 7 into which support tab 31 is also introduced.

The fluid collected in the clean chamber is discharged via an outflow aperture 8 which is introduced into side part 7 without positive-locking elements. An outflow pipe 9 connects to outflow aperture 8, which is integrally formed with filter element housing 17.

Buffer elements 34 preferably made of a flexible material, for example, of a vibration dampening material, are situated at walls 21, 22 of receiving pockets 18 or 19. In the installed state, filter element 1 can be braced via buffer elements 34 at the interior walls of the receiving filter housing.

Figure 4:
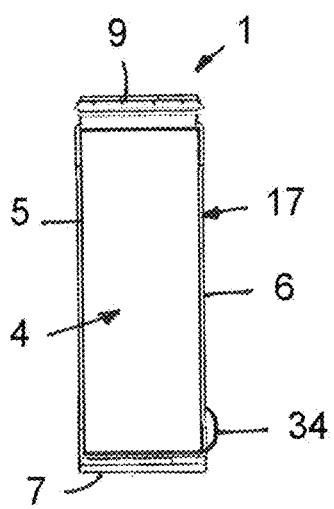
FIG. 4 shows a variant embodiment of a filter element having buffer elements disposed at the top side of the filter element housing.

FIG. 4 shows a variant embodiment in which buffer elements 34, in contrast to the first exemplary embodiment, are not disposed at side part 7 but at cover part 6. Additionally or alternatively, buffer elements 34 can also be disposed at bottom part 5. The positioning of the buffer elements at either the side part or at the bottom or cover part depends on the installation conditions and the available space for filter element 1.

Figure 5:
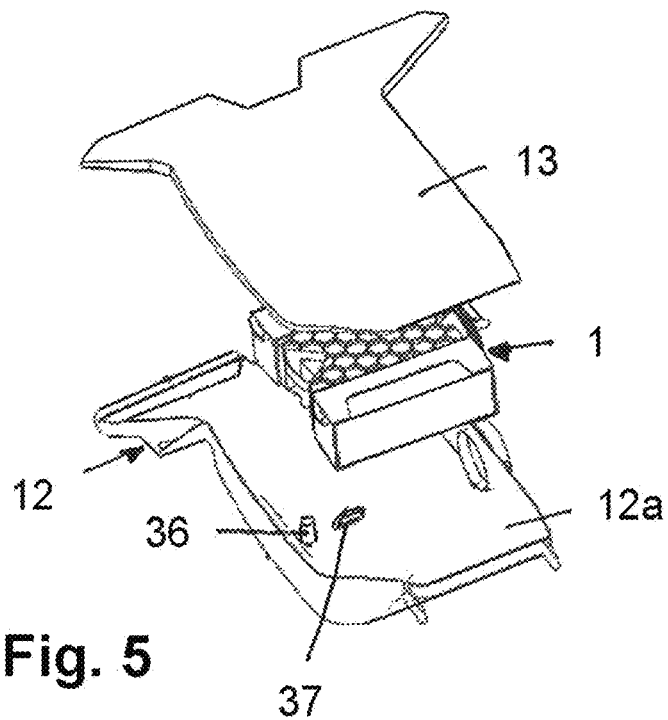
FIG. 5 shows an explosion view of a filter device having a filter housing and a filter element according to FIGS. 1 through 3.
Figure 6:
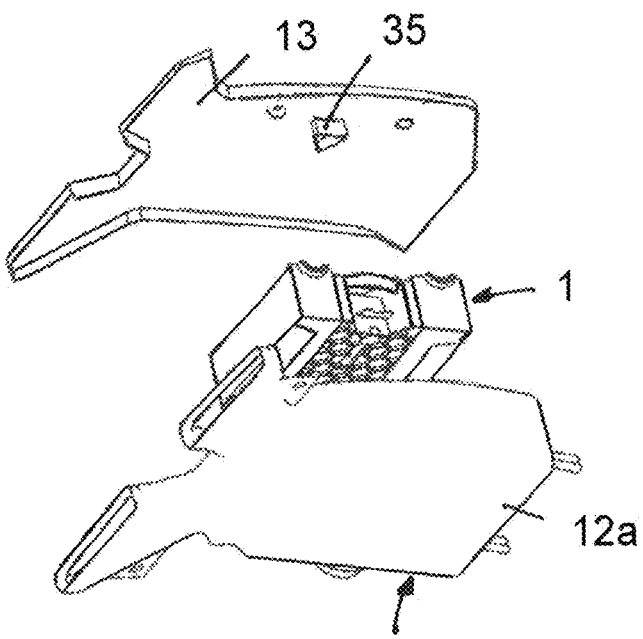
FIG. 6 shows the filter device in a further perspective view.

FIGS. 5 and 6 shows different views of the filter device having filter housing 12 and filter element 1. Filter housing 12 comprises a receiving housing 12*a* having a receiving chamber for filter element 1 and a housing cover 13 fittable onto receiving housing 12*a*. Integrally formed positive-locking elements 35, 36, and 37 are disposed at filter housing 12, which act together with positive-locking elements 30, 31 and 32 at filter element 1. Positive-locking element 35 is implemented as a triangular protrusion or protruding holder at the inside of housing cover 13 and in the assembled state projects into triangular recess 30 at cover part 6 of filter element 1. Positive-locking element 36 is configured as a support dome disposed at the bottom on the inside of receiving housing 12*a* and projects upwards. Support dome 36 is assigned to support tab 31 at filter element 1.

Further positive-locking element 37 is, in an offset manner to support dome 36, located also at the bottom of the inside of receiving housing 12*a*, which is formed in the shape of a protrusion or a protruding transverse support chamfered on one side. Protrusion 37 is assigned to groove-shaped recess 32 at bottom part 5 of filter element 1.

Figure 7:
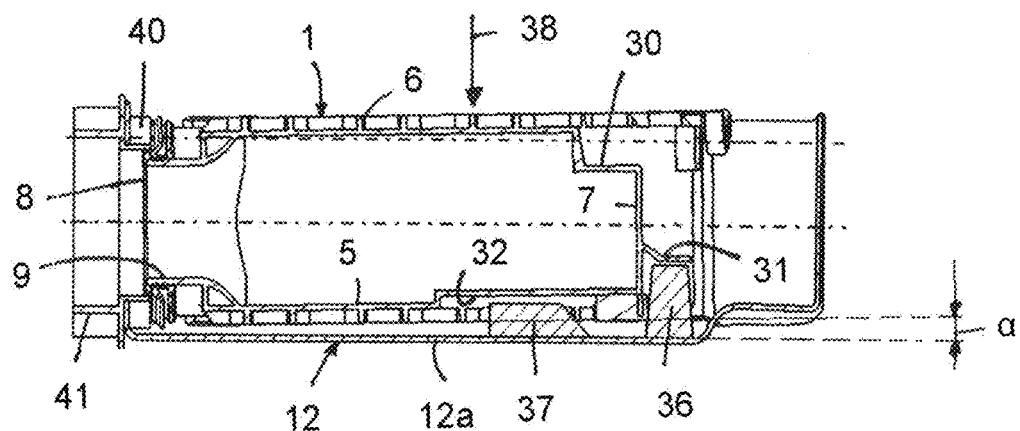
FIG. 7 shows a section through the filter device having the filter element in a receiving housing, however, without a housing cover.
Figure 8:
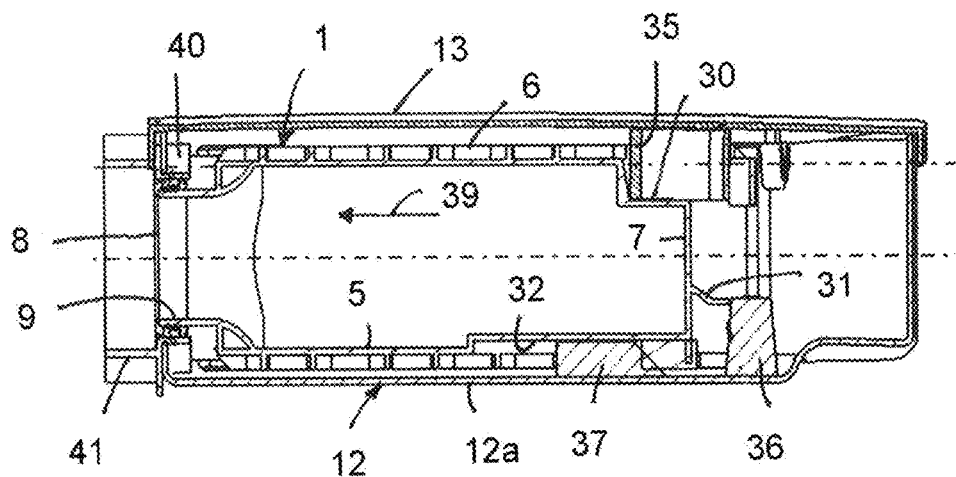
FIG. 8 shows a view corresponding to FIG. 7, however, additionally having a fitted housing cover.

FIGS. 7 and 8 show the filter device in two different stages of assembly. In FIG. 7, the filter device is in an intermediate stage; in FIG. 8, it is in the fully assembled position.

According to FIG. 7, filter element 1 is inserted according to insertion direction 38 from above into open receiving housing 12*a*. In this instance, the positive-locking elements come into contact at filter element 1 and at the bottom of receiving housing 12*a*. Support tab 31 at the outside of side part 7 abuts at the end face of support dome 36 disposed at the bottom of receiving housing 12*a*. Protrusion 37 also situated at the bottom of receiving housing 12*a* projects into groove-shaped recess 32 in bottom part 5 of filter element 1.

If cover 13 is fitted onto receiving housing 12*a*, additional protrusion 35 at the bottom side of housing cover 13 engages with triangular recess 30 at cover part 6 of filter element 1. The front wall of recess 30 is chamfered so that the front edge of the protrusion, by fitting housing cover 13 and by protrusion 30 engaging, slides downwards along the chamfer and, in doing so, filter element 1 is displaced transversely to insertion direction 38 according to arrow 39 into its final position. In this instance, it is advantageous that in a first phase according to FIG. 7, filter element 1 is inserted into receiving housing 12*a* at a low slope α of only a few degrees, for example, 1° to 2°. The slope can, for example, be realized in that support tab 31 rests in an appropriate position on the end face of support dome 36. At the same time, support tab 31 can be slightly bend upwards by its free end, preferably at the same angular magnitude as slope α to support the feed movement according to arrow 39 when fitting housing cover 13. The end face of support tab 31 is braced in the opposite direction of installation position 39 at support dome 36.

A nozzle 41 is located at the receiving housing, which in the assembled state is situated coaxially to outflow aperture 8 and to outflow pipe 9 at filter element 1. With the feed movement of filter element 1 in the direction of arrow 39 during the fitting of housing cover 13, outflow pipe 9 at filter element 1 is inserted into nozzle 41 at receiving housing 12*a*. In this instance, a pre-installed sealing element 40 is pressed onto the inner surface shell of nozzle 41, as a result of which a flow-tight connection is established between filter element 1 and receiving housing 12*a* in the area of the outflow aperture.

What is claimed is:

1. A filter device, comprising:
    a filter housing having a receiving chamber;
    a filter element including:
        at least one filter media body; and
        a filter element housing configured to receive the at least one filter media body, the filter element housing configured to removably install into the receiving chamber of the filter housing in an installation direction, the filter element housing having at least on outflow aperture for discharge of a cleaned fluid;
    wherein the filter element delimits a clean chamber of the filter element housing from which the cleaned fluid is to be discharged via the at least one outflow aperture;

wherein cooperating positive-locking elements are disposed at the filter housing and at the filter element housing, the positive-locking elements engaging to form a positive locking to hold the filter element in the filter housing in an opposite direction relative to the installation direction of the filter element into the filter housing;
wherein the filter element housing has at least one of the positive-locking elements formed as a triangular recess;
wherein the filter housing has at least one of the positive-locking elements formed as a protrusion, protruding into the receiving chamber, and having a triangular cross-section corresponding to the triangular recess;
wherein the filter housing protrusion lockingly engages into the triangular recess of the filter element housing, positive lockingly holding the filter element in the filter housing.

2. The filter device according to claim 1, wherein
the at least one filter media body includes:
a first filter media body; and
a second filter media body;
wherein the filter media bodies are arranged at the filter element housing;
wherein the filter media bodies with the filter element housing delimit a common clean chamber.

3. The filter device according to claim 1, wherein
the filter element is insertable in two successive, different installation directions into the filter housing.

4. The filter device according to claim 1, wherein
positive-locking elements are disposed in a receiving housing of the filter housing and at a housing cover of the filter housing.

5. The filter device according to claim 4, wherein
by fitting the housing cover onto the receiving housing in a fitting direction, the filter element is displaced transversely to the fitting direction.

6. The filter device according to claim 1, wherein
the triangular recess is formed by a handle on the filter element housing, the handle having an edge-sided boundary section curved convexly outwards in an area of the triangular recess at the filter element housing.

7. A filter element for a filter device according to claim 1, the filter element comprising:
a first filter media body;
a second filter media body;
a filter element housing having an interior clean chamber, the filter element housing including:
a cover wall covering and closing off a first side of the interior clean chamber;
a bottom wall spaced away from the cover wall, covering and closing off an opposing second side of the interior clean chamber, such that the interior clean chamber lies between the cover wall and the bottom wall;
a first side wall arranged on an outflow side of the interior clean chamber, the first sidewall connected directly to and extending from the cover wall to the bottom wall, the first side wall covering the outflow side of the interior clean chamber, the first sidewall having:
an outflow aperture extending through the first side wall into the interior clean chamber;
a second side wall spaced away from the first side wall, covering and closing off the interior clean chamber at a side opposite the first side wall;
two receiving pocket parts arranged on opposite sides of the filter element housing and arranged on opposite lateral sides of the interior clean chamber, two receiving pocket parts arranged on and connect to opposite ends of the cover wall, the bottom wall, the first side wall and the second side wall, such that the cover wall, the bottom wall, the first side wall and the second side wall bridge between and interconnect the two receiving pocket parts, each receiving pocket parts having:
a receiving pocket into which a respective one of the filter media bodies is inserted, the receiving pocket having:
circumferential pocket walls which circumferentially close around and define the receiving pocket therein;
wherein the receiving pocket opens into the interior clean chamber;
wherein the receiving pocket, at a side opposite the interior clean chamber, opens outwardly away from the filter element housing for insertion of the filter media bodies from an exterior of the filter element housing;
wherein the filter element housing is configured to removably install, in two successive, different installation directions, where installed into a receiving chamber of a filter housing configured to receive the filter element;
at least one positive-locking element disposed on the cover wall, the bottom wall or the second side wall of the filter element housing;
wherein at least one of the at least one positive-locking elements is selected from the group consisting of:
a support tab formed on the second side wall to support the filter element in the filter housing, the support tab projecting laterally outwardly away from the filter element housing, or
a support member having a triangular recess, the triangular recess configured to receive a filter housing protrusion having a triangular cross section corresponding to the triangular recess; or
a recess formed into the bottom wall of the filter element housing, the recess configured to receive a filter housing protrusion having a triangular cross section corresponding to the triangular recess;
wherein the at least one positive-locking element lockably engages the filter housing to positive lockingly hold the filter element in the filter housing;
wherein the filter element delimits a clean chamber of the filter element housing from which the cleaned fluid is to be discharged via the at least one outflow aperture.

8. The filter element according to claim 7, wherein
at least two positive-locking elements are disposed at the filter element housing.

9. The filter element according to claim 8, wherein
the positive-locking elements at the filter element are disposed at the same side of the filter element housing.

10. The filter element according to claim 7, wherein
the recess formed into the bottom wall of the filter element housing is formed as a recess having a defined cross-sectional shape.

11. The filter element according to claim 10, wherein
an edge-sided boundary section of the recess is curved convexly outwards at the filter element housing.

12. The filter element according to one of claim 10, wherein
two recesses are disposed at diametrically opposite sides at the filter element housing.

13. The filter element according to claim 7, wherein
the first filter media body and the second filter media body are each received into an outwardly open receiving pocket at the filter element housing.

14. The filter element according to claim 7, comprising
buffer elements disposed at an outside of the filter element housing.

15. The filter element according to claim 7, wherein
the filter medium bodies have pleated filter media;
wherein the filter element housing is formed as a plastic injection molding component.

16. The filter element according to claim 7, comprising
at least one positive-locking element and/or boundary elements configured as a handle is situated in a rear offset of the filter element housing and are at least partially completely disposed between the first filter media body and the second filter media body.

17. The filter element according to claim 16, wherein
the at least one positive-locking element is formed as a support tab; and a boundary element formed as a handle are disposed in a same rear offset of the filter element housing.

18. A filter device, comprising:
a filter housing having a receiving chamber;
a filter element including:
 a first filter media body;
 a second filter media body;
 a filter element housing having an interior clean chamber, the filter element housing including
  a cover wall covering and closing off a first side of the interior clean chamber;
  a bottom wall spaced away from the cover wall, covering and closing off an opposing second side of the interior clean chamber, such that the interior clean chamber lies between the cover wall and the bottom wall;
  a first side wall arranged on an outflow side of the interior clean chamber, the first sidewall connected directly to and extending from the cover wall to the bottom wall, the first side wall covering the outflow side of the interior clean chamber, the first sidewall having:
   an outflow aperture extending through the first side wall into the interior clean chamber;
  a second side wall spaced away from the first side wall, covering and closing off the interior clean chamber at a side opposite the first side wall;
  two receiving pocket parts arranged on opposite sides of the filter element housing and arranged on opposite lateral sides of the interior clean chamber, two receiving pocket parts arranged on and connect to opposite ends of the cover wall, the bottom wall, the first side wall and the second side wall, such that the cover wall, the bottom wall, the first side wall and the second side wall bridge between and interconnect the two receiving pocket parts, each receiving pocket part having:
   a receiving pocket into which a respective one of the filter media bodies is inserted, the receiving pocket having:
    circumferential pocket walls which circumferentially close around and define the receiving pocket therein;
   wherein the receiving pocket opens into the interior clean chamber;
   wherein the receiving pocket, at a side opposite the interior clean chamber, opens outwardly away from the filter element housing for insertion of the filter media bodies from an exterior of the filter element housing;
   wherein the receiving pocket, at a side opposite the interior clean chamber, opens to an exterior of the filter element housing for insertion of the filter media body;
  wherein the filter element housing is configured to removably install, in two successive, different installation directions, into the receiving chamber of the filter housing;
  at least one positive-locking element disposed on any of the cover wall, the bottom wall or the second side wall of the filter element housing;
wherein the filter housing has at least one complimentary positive-locking element arranged in the receiving chamber and fixed to the filter housing, and positively lockingly interlocking with respective ones of the at least one positive-locking element to form a positive locking holding the filter element in the filter housing in an opposite direction relative to an installation direction of the filter element into at the filter housing.

19. The filter device according to claim 18, wherein
at least one of the at least one positive-locking elements is selected from the group consisting of:
 a support tab formed on the second side wall to support the filter element in the filter housing, the support tab projecting laterally outwardly away from the filter element housing, or
 a support member having a triangular recess, the triangular recess configured to receive a filter housing protrusion having a triangular cross section corresponding to the triangular recess; or
 a recess formed into the bottom wall of the filter element housing, the recess configured to receive a filter housing protrusion having a triangular cross section corresponding to the triangular recess;
wherein the at least one positive-locking element lockably engages the filter housing to positive lockingly hold the filter element in the filter housing.

20. The filter device according to claim 18, wherein
first positive-locking elements hold the filter element in the opposite direction of the first installation direction; and
second positive-locking elements hold the filter element in the opposite direction of the second installation direction.

21. The filter device according to claim 18, wherein
a positive-locking element is formed as a laterally projecting support tab at the filter element housing, to which a support dome as a complimentary positive-locking element provided at the filter housing.

22. The filter device according to claim 21, wherein
an end edge of the support tab is braced against the support dome.

23. The filter device according to claim 18, wherein
a positive-locking element is formed at the filter element housing as a recess having a defined cross-sectional shape, to which a protrusion having a corresponding cross-sectional shape is disposed on a housing cover of the filter housing.

24. The filter device according to claim 23, wherein two recesses are situated at diametrically opposite sides at the filter element housing, into which protrusions engage at a bottom of the receiving housing or at the housing cover.

\* \* \* \* \*